UNITED STATES PATENT OFFICE.

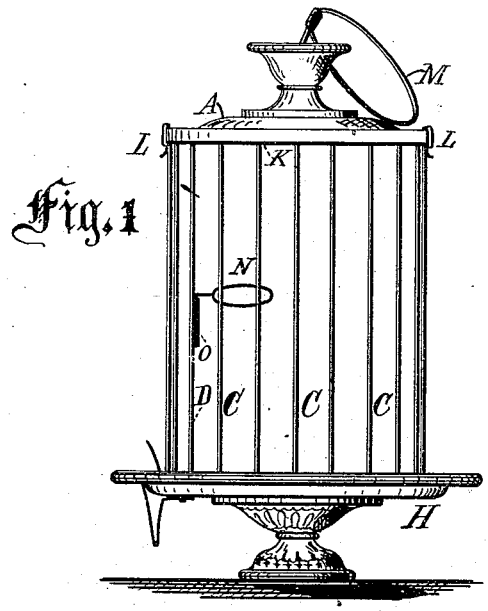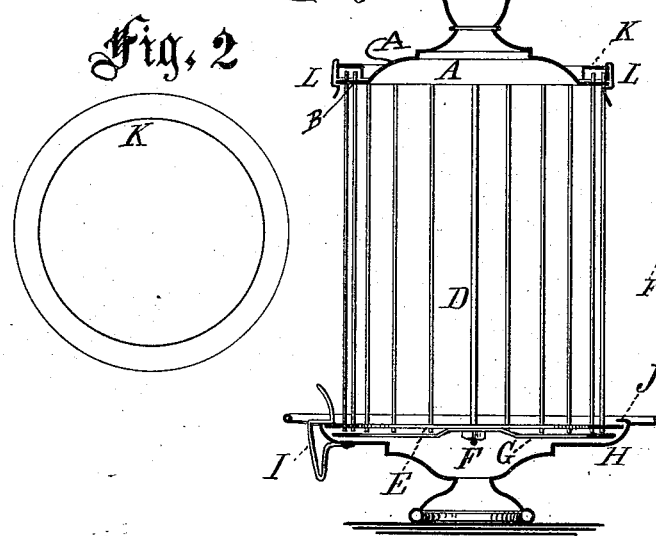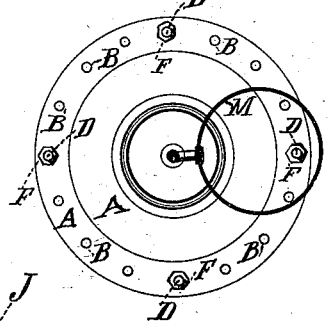

SIDNEY B. KING, OF BUFFALO, NEW YORK.

IMPROVEMENT IN BIRD-CAGES.

Specification forming part of Letters Patent No. 186,937, dated February 6, 1877; application filed July 1, 1876.

*To all whom it may concern:*

Be it known that I, SIDNEY B. KING, of the city of Buffalo, in the county of Erie and State of New York, have invented certain new and useful Improvements in Bird-Cages, which improvements are fully set forth in the following specification, reference being had to the accompanying drawings.

The nature of my invention consists, first, in the combination of a removable top provided with a series of holes around the same near the outer edge, and a correspondingly-perforated bottom rim, having a non-perforated rim below it, with the necessary support or supports for holding the same rigid, and a series of removable bars of glass or other suitable material, the whole being so combined and arranged that it can be easily and quickly put together or taken apart for convenience in packing and transportation, as will be more clearly hereinafter shown.

The second part of my invention relates to the mechanism for attaching or detaching the cage to and from the bottom; and it consists in providing the bottom with a spring-catch, and an inwardly-projecting lip or flange, and combining the same with the bottom rim of the cage-frame, for the purposes mentioned.

The third part of my invention consists in the arrangement and combination of a device with one of the bars of the cage-frame, whereby the feed or water cups may be easily adjusted, so as to be either inside or outside of the same; also, in the combination of the cage-top and lower perforated and non-perforated rims, with an annular rim held to the top by springs for the purpose of retaining the removable bars in place when required.

In said drawings, Figure 1 represents a side elevation of the cage complete; Fig. 2, a top view of the annular rim. Fig. 3 represents a vertical central section through the cage, and Fig. 4 a top or plan view.

A is the top of the cage. It is perforated at B, as shown in Fig. 4, to receive the bars C. D represents the supporting-bars, which are held firmly to the top A and bottom rim E by means of the nuts F. G is the non-perforated rim. (Shown in section, Fig. 3.) It is also held to the bottom rims by means of the nuts F. H represents the bottom of the cage. It is provided with a spring, I, and an inwardly-projecting lip or flange, J, for the purpose of connecting or disconnecting the cage, as will be readily seen.

In putting the cage together the four supports or bars D (of which there may be more or less) are fastened to the top and bottom rim by means of the nuts F, and the bars C are then passed through the perforations B in the top, and through corresponding perforations in the rim E, the rim G preventing them from going through too far. The annular rim K is then put on, and held in place by means of the springs L. M is the ring by which the cage is hung up.

It will be noticed that the rim K is left off in Fig. 4.

N represents a bracket for supporting the feed or water cups It is made removable by the tube or sleeve O, into which it slips, as shown.

By raising one of the bars C and turning the bar D, to which it is connected, it may be turned so as to bring the cup outside of the cage, if desired.

I claim as my invention—

1. The combination of the removable perforated top A, correspondingly-perforated rim E, rim G, the supports D, and removable bars C, substantially as and for the purposes described.

2. The combination and arrangement of the bracket N, sleeve O, and movable bar D, for the purposes set forth.

3. The combination of the top A, annular piece K, spring L, and removable bars C, as and for the purposes described and shown.

SIDNEY B. KING.

Witnesses:
F. P. STIKER,
WM. S. GROSVENOR.